US008827157B1

United States Patent
Foster et al.

(10) Patent No.: US 8,827,157 B1
(45) Date of Patent: Sep. 9, 2014

(54) DETECTING LASER SCANNER USAGE AND ADJUSTING APPLICATION BEHAVIOR

(71) Applicant: Google Inc., Mountain View, CA (US)

(72) Inventors: Marcus Alexander Foster, West Malling (GB); Chandrasekhar Thota, Saratoga, CA (US); David Singleton, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/921,961

(22) Filed: Jun. 19, 2013

(51) Int. Cl.
*G06K 5/00* (2006.01)
*G06K 7/14* (2006.01)
(52) U.S. Cl.
CPC ................................. *G06K 7/1404* (2013.01)
USPC .......................................... 235/437; 235/375
(58) Field of Classification Search
CPC ............. G06K 5/00; G06K 7/10; G06K 7/08; G06K 7/14; G06K 7/00; G06F 17/00; G03B 7/08
USPC ........... 235/437, 375, 462.01, 462.11, 462.24
See application file for complete search history.

(56) References Cited

U.S. PATENT DOCUMENTS

| | | | | |
|---|---|---|---|---|
| 2008/0142599 | A1* | 6/2008 | Benillouche et al. | 235/462.41 |
| 2010/0072280 | A1* | 3/2010 | McGill et al. | 235/462.13 |
| 2012/0061462 | A1* | 3/2012 | Shadwell et al. | 235/375 |
| 2013/0181054 | A1* | 7/2013 | Durham et al. | 235/462.41 |

* cited by examiner

*Primary Examiner* — Edwyn Labaze
(74) *Attorney, Agent, or Firm* — Johnson, Marcou & Isaacs, LLC

(57) ABSTRACT

A scanner detection model is created by a detection system to determine whether a laser scanner is present so the user is notified of the potential inability to accurately read a machine-readable identifier on a user device. A user operating the user device accesses an electronic record and a machine-readable identifier that comprises information identifying the electronic record is displayed on the user device. A scanner detection module detects display of the machine-readable identifier and turns on a camera resident on the user device. The camera captures and analyzes images. The scanner detection module identifies whether the scanner is a laser scanner based on an analysis of the images and the scanner detection model created by the detection system. If the scanner is a laser scanner, a message is displayed on the user device indicating that the machine-readable identifier is to be entered or inputted, instead of scanned.

22 Claims, 6 Drawing Sheets

DETECTING LASER SCANNER USAGE AND ADJUSTING APPLICATION BEHAVIOR

TECHNICAL FIELD

The present disclosure relates generally to laser scanner detection, and more particularly to methods and systems for detecting a laser scanner and altering the behavior of an application executing on a user device based on the detection.

BACKGROUND

Merchants offer coupons or rebates as incentives for purchasing particular products. Traditionally, coupons are distributed in a paper format. A user redeems the coupon by taking the physical coupon to a merchant and purchasing a product that satisfies the terms of the coupon. Other forms of traditional coupons include rebates for purchasing particular products, wherein after purchasing a product that satisfies the terms of the rebate offer, the user fills out and returns required forms to request the rebate.

More recently, merchants have offered electronic offers. Such offers may be linked to merchant loyalty cards, wherein a user enrolls in a merchant's loyalty program and receives a loyalty card. A user then associates certain discounts to the loyalty card and redeems these discounts by presenting the loyalty card (or some form of identifying information, such as a telephone number) and the method of payment to the merchant when purchasing the discounted products.

With the advent of smart phone technology, merchants are now able to present users with electronic offers that are accessed and saved using an offer application resident on a wireless communication device. Users can search for offers using various offer applications and present a selected offer to a merchant for redemption without requiring paper coupons, loyalty cards, or rebate forms.

SUMMARY

In certain example aspects described herein, a method for detecting laser scanners comprises a scanner detection model created by a detection system to determine whether a laser scanner is present so the user is notified of the potential inability to accurately read a machine-readable identifier on a user computing device. The detection system gathers images related to laser scanners and images related to non-laser scanners, and analyzes the images to learn to identify features of a laser scanner in operation and to detect image patterns that will aid in the identification of a laser scanner that is trying to scan information on the user device.

A user operating the user device accesses an electronic record and a machine-readable identifier that comprises information identifying the electronic record is displayed on a user interface of the user device. A scanner detection module detects display of the machine-readable identifier and turns on a camera resident on the user device. The camera captures and analyzes images. The scanner detection module identifies whether the scanner is a laser scanner based on an analysis of the captured images and the scanner detection model created by the detection system. If the scanner is a laser scanner, a message is displayed on the user device indicating that the machine-readable identifier is to be entered or inputted, instead of scanned.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
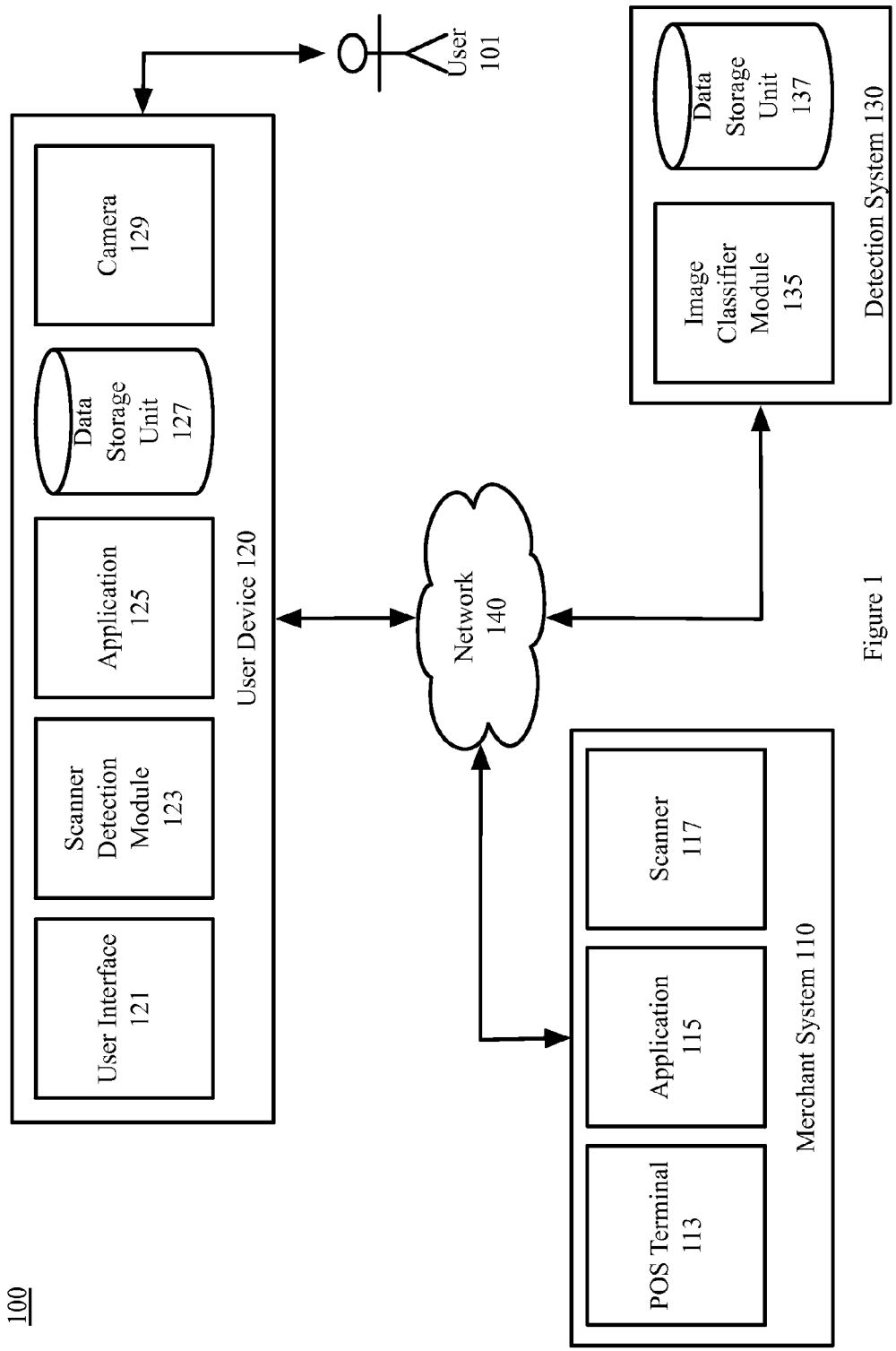
FIG. 1 is a block diagram depicting a laser scanner detection system, in accordance with certain example embodiments.

The example embodiments described herein provide computer-implemented techniques for detecting a laser scanner and altering the behavior of an application executing on a user device based on the detection. In an example embodiment, the user device displays an offer (for example, a loyalty reward, coupon, discount, or other offer redeemable with a merchant, manufacturer, service provider, and/or provider of goods), a ticket (for example, a concert ticket or sporting event ticket), a boarding pass, a voucher, a form of identification, or other document that utilizes a barcode on the user interface to be scanned by a scanner (for example, a point of sale scanner). In an example embodiment, the offer comprises a barcode (such as a one-dimensional barcode, a QR code or other form of two-dimensional code, or other machine-readable code) that is read by the scanner. In an example embodiment, the scanner is a laser scanner, wherein controlled deflection of laser beams allows the scanner to read barcode or other machine-readable information. However, when certain machine-readable information is displayed on the user interface of the user device, many scanners, such as laser scanners, are unable to accurately read that information. Accordingly, the methods and systems described herein detect when a laser scanner is trying to scan information displayed on the user interface of the user device and, when detected, displays a message notifying the user and/or the scanner operator that the scanner cannot detect the displayed information. The user and/or scanner operator can be further instructed to manually input the information into the operator's system.

A detection system creates a scanner detection model. In an example embodiment, the scanner detection model is an artificial neural network or other form of adaptive system model, wherein the system analyzes data and relationships to find patterns in data. In an example embodiment, the model is used to determine whether a laser scanner is present so the user is notified of the potential inability to accurately read the barcode or other information. The detection system gathers images related to laser scanners and images related to non-laser scanners. In an example embodiment, the system gathers multiple, perhaps hundreds or thousands of images. The detection system analyzes the images and learns to identify features of a laser scanner in operation and to detect image patterns that will aid in the identification of a laser scanner that is trying to scan information on a user device. In an example embodiment, this process is an ongoing learning process, wherein images are continuously added to the detection system and the model is continuously updated. In an example embodiment, a user operating the user device enables a scanner detection feature on the user device.

The user operating the user device accesses an offer, and the barcode comprising information identifying the offer is displayed on the user interface of the user device. The user shows the displayed barcode to the scanner operator, who then scans the displayed barcode. In another example, the user places the displayed barcode within a detection field of a scanner.

The scanner detection module detects display of the barcode and turns on the camera resident on the user device. The camera captures images at predefined intervals (for example, every tenth of a second, every second, or any other predefined interval). The scanner detection module analyzes the images. In an example embodiment, the scanner detection module comprises code from the detection system that allows it to identify features of a laser scanner trying to scan information and to detect image patterns that will aid in the identification of a laser scanner. The scanner detection module identifies whether the scanner is a laser scanner. If the scanner is a laser scanner, a message is displayed on the user device directing the merchant to enter the offer code instead of scanning the barcode. In order to take advantage of the techniques described herein, and, e.g., have the camera automatically turn on, the user may have to activate a setting or install an application on her mobile device.

The scanner detection module saves the images with the corresponding laser scanner classification. When the user device has network access or at predefined intervals, the saved images and corresponding laser scanner classifications are sent to the detection system to update the scanner detection model.

The functionality of the example embodiments will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting a laser scanner detection system, in accordance with certain example embodiments. As depicted in FIG. 1, the exemplary operating environment 100 includes a merchant computing system 110, a user computing device 120, and a detection computing system 130 that are configured to communicate with one another via one or more networks 140. In another example embodiment, two or more of these systems (including systems 110, 120, and 130) are integrated into the same system. In some embodiments, a person associated with a device must install an application and/or make a feature selection to obtain the benefits of the techniques described herein.

Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) includes a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by merchants, users 101, and a detection system operator, respectively.

The merchant system 110 comprises at least one point of sale ("POS") terminal 113 that is capable of processing a purchase transaction initiated by a user 101, for example a cash register. In an example embodiment, the merchant operates a commercial store and the user 101 indicates a desire to make a purchase by presenting a form of payment at the POS terminal 113. In another example embodiment, the merchant operates an online store and the user 101 indicates a desire to make a purchase by clicking a link or "checkout" button on a website. In another example embodiment, the user device 120 is configured to perform the functions of the POS terminal 113. In this example, the user 101 scans and/or pays for the transaction via the user device 120 without interacting with the POS terminal 113. In another example embodiment, the merchant operates a business requiring the scanning or entering of a bar code or other form of identification (for example, a ticket, voucher, form of identification, boarding pass, or other document that utilizes a barcode.

In an example embodiment, the merchant system 110 comprises a scanner 117 that is capable of communicating with a user device 120 and the POS terminal 113 via an application 115. In an example embodiment, the scanner 117 is capable of reading or scanning a code (for example, a barcode, such as a one-dimensional barcode, a QR code or other form of two-dimensional code, or other machine-readable code). In an example embodiment, the scanner 117 is a barcode scanner and may be configured to read any number of barcode formats, including without limitation, a universal product code ("UPC"), a global trade item number ("GTIN"), a stock keeping unit ("SKU"), a Japanese article number ("JAN"), a world product code ("WPC"), an International Standard Book Number ("ISBN"), a European Article Number ("EAN"), etc. According to other example embodiments, scanner 117 may be an electronic field generator with a CPU, a laser scanner, a charged-coupled device ("CCD") reader, a complementary metal-oxide semiconductor ("CMOS") reader, a camera-based reader, an omni-directional barcode scanner, a camera, a RFID reader, or any other device that is capable of reading product identifier information, offer information, and/or other forms of information depicted in a machine-readable identifier or barcode in a merchant system 110.

In an example embodiment, the merchant system 110 is capable of communicating with the user device 120 via the application 115. The application 115 may be an integrated part of the POS terminal 113 or a standalone hardware device (not shown), in accordance with alternative example embodiments.

In an example embodiment, the user device 120 may be a personal computer, mobile device (for example, notebook, computer, tablet computer, netbook computer, personal digital assistant ("PDA"), video game device, GPS locator device, cellular telephone, Smartphone or other mobile device), television, or other appropriate technology that includes or is coupled to a web server, or other suitable application for interacting with web page files. The user 101 can use the user device 120 to display an offer, voucher, boarding pass, form of identification, or other document comprising a barcode via a user interface 121 and an application 125. The application 125 is a program, function, routine, applet or similar entity that exists on and performs its operations on the user device 120. For example, the application 125 may be one or more of a shopping application, merchant system 110 application, an Internet browser, a digital wallet application, a loyalty card application, another value-added application, a user interface 121 application, or other suitable application operating on the user device 120. In some embodiments, the user 101 must install an application 125 and/or make a feature selection on the user device 120 to obtain the benefits of the techniques described herein.

In an example embodiment, the user interface 121 displays a machine-readable code, such as a barcode, to be read by the scanner 117. The methods described herein are performed to determine whether the scanner 117 is capable of reading the machine-readable code. As used herein, the term barcode refers to any form of machine-readable code.

An example user device 120 comprises a scanner detection module 123. An example scanner detection module 123 is a browser plug-in or user device 120 operating system component corresponding to the detection system 130. The scanner detection module 123 may be an integrated part of the application 125, an integrated part of the user device 120 operating system, an integrated part of the detection system 130, or a standalone hardware device (not shown), in accordance with other example embodiments. The user 101 installs the scanner detection module 123 on the user device 120 to facilitate the detection of a laser scanner and provide a notification alerting the user 101 and/or merchant to manually enter the barcode information. In an example embodiment, the camera 129 communicates with the scanner detection module 123. For example, the camera 129 provides data to the scanner detection module 123 to allow for the detection of a laser scanner. In an example embodiment, the scanner detection module 123 comprises application programming interfaces ("APIs") that allow the module 123 to interact and communicate with the application 125 and/or camera 129.

In an example embodiment, the camera 129 is able to capture photographs and/or video images via the user device 120. In an example embodiment, the captured images are saved in the data storage unit 127 and available for analysis by the scanner detection module 123.

In an example embodiment, the data storage unit 127 and application 125 may be implemented in a secure element or other secure memory (not shown) on the user device 120. In another example embodiment, the data storage unit 127 may be a separate memory unit resident on the user device 120. An example data storage unit 127 enables storage of user contact details for retrieval of a user offer system 130 account. In an example embodiment, the data storage unit 127 can include any local or remote data storage structure accessible to the user device 120 suitable for storing information. In an example embodiment, the data storage unit 127 stores encrypted information, such as HTML5 local storage.

An example user device 120 communicates with the detection system 130. An example detection system 130 comprises an image classifier module 135. The image classifier module 135 gathers images related to laser scanners and images related to non-laser scanners. In an example embodiment, the image classifier module 135 gathers multiple, perhaps hundreds or thousands of images. The image classifier module 135 analyzes the images and learns to identify features of a laser scanner in operation and to detect image patterns that will aid in the identification of a laser scanner that is trying to scan information from the user device 120. In an example embodiment, the image classifier module 135 creates a scanner detection model. The scanner detection model is an artificial neural network or other form of adaptive system model, wherein the image classifier module 135 analyzes data and relationships to find patterns in data. In an example embodiment, the model is used to determine whether a laser scanner is present so the user 101 is notified of the potential inability to accurately read the barcode or other information. In an example embodiment, this process is an ongoing learning process, wherein images are continuously added to the image classifier module 135 and the model is continuously updated. The images and laser scanner detection model are saved in the data storage unit 137.

In an example embodiment, the data storage unit 137 can include any local or remote data storage structure accessible to the detection system 130 suitable for storing information. In an example embodiment, the data storage unit 137 stores encrypted information, such as HTML5 local storage.

The components of the example operating environment 100 are described hereinafter with reference to the example methods illustrated in FIGS. 2-5. The example methods of FIG. 2-5 may also be performed with other systems and in other environments.

Example System Processes

Figure 2:
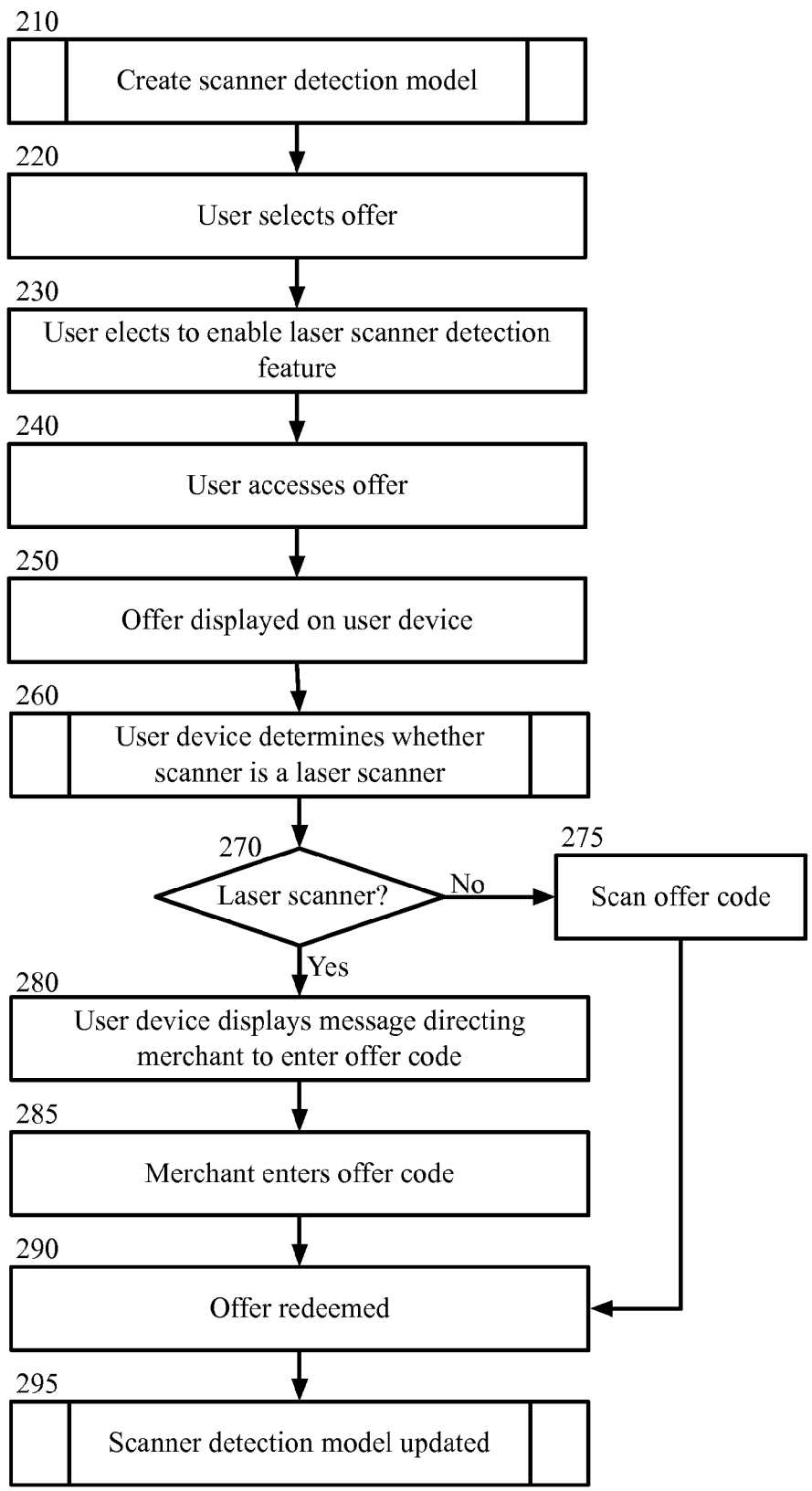
FIG. 2 is a block flow diagram depicting a method for detecting a laser scanner, in accordance with certain example embodiments.

FIG. 2 is a block flow diagram depicting a method for detecting a laser scanner, in accordance with certain example embodiments. The method 200 is described with reference to the components illustrated in FIG. 1.

In block 210, a scanner detection model is created by a detection system 130. In an example embodiment, the scanner detection model is an artificial neural network or other form of adaptive system model, wherein the model analyzes data and relationships to find patterns in data. An artificial neural network is a computational module that functions to process information, such as studying behavior, pattern recognition, forecasting, and data compression. An example scanner detection model may be hardware and software based or purely software based and run in computer models. In an example embodiment, the scanner detection model comprises inputs (for example images) that are multiplied by weights and then computed by a mathematical function to determine the output (for example, whether or not a laser scanner is detected). Depending on the weights, the computation will be different. In an example embodiment, an algorithm is used to adjust the weights of the scanner detection model in order to obtain the desired output from the network (for example, to accurately identify a laser scanner). In an example embodiment, the scanner detection model is used to determine whether a laser scanner is present so the user 101 is notified of the potential inability to accurately read barcode information. The method for creating a scanner detection model is described in more detail hereinafter with reference to the methods described in FIG. 3.

Figure 3:
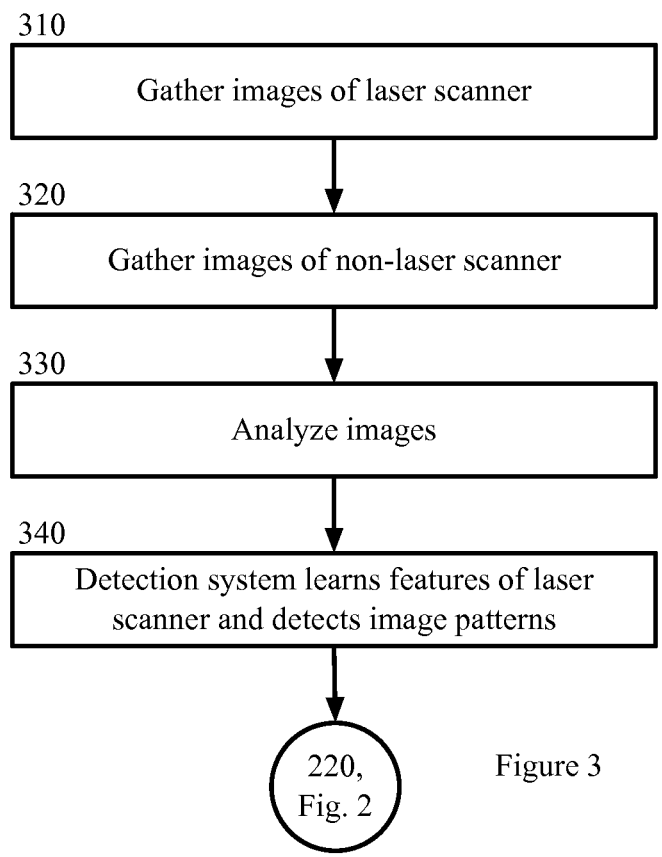
FIG. 3 is a block flow diagram depicting a method for creating a laser scanner detection model, in accordance with certain example embodiments.

FIG. 3 is a block flow diagram depicting a method 210 for creating a laser scanner detection model, in accordance with certain example embodiments, as referenced in block 210. The method 210 is described with reference to the components illustrated in FIG. 1.

In block 310, the detection system 130 gathers images of laser scanners. In an example embodiment, a laser scanner produces controlled deflection of laser beams that allows the scanner to read a barcode or other machine-readable information. In an example embodiment, many laser scanners rely on the reflective properties of paper to accurately read a barcode. The reflective nature of a user device screen makes it difficult for the laser scanner sensor to differentiate the black and white bars of a barcode and accurately read the information. In an example embodiment, the detection system 130 gathers multiple, perhaps hundreds or thousands, of images of laser scanners. In an example embodiment, the images are obtained from user devices, the Internet, merchant systems, or other suitable locations. An operator of the detection system 130 may also input images into the detection system 130 or otherwise operate the detection system 130 to capture the images. In an example embodiment, the detection system 130 continues to gather images of laser scanners to update the scanner detection model, as described herein.

In block 320, the detection system 130 gathers images of non-laser scanners. In an example embodiment, non-laser scanners comprise camera-based barcode scanners, two-dimensional scanners, CCD readers, CMOS readers, LED scanners, and other suitable non-laser scanners. In an example embodiment, non-laser scanners are not dependent upon emitting on a single beam of light that follows a specific path between the scanner, bar code, and the barcode background, like laser scanners are. In an example embodiment, the detection system 130 gathers multiple, perhaps hundreds or thousands, of images of non-laser scanners. In an example embodiment, the images are obtained from user devices, the Internet, merchant systems, or other suitable locations. An operator of the detection system 130 may also input images into the detection system 130 or otherwise operate the detection system 130 to capture the images. In an example embodiment, the detection system 130 continues to gather images of non-laser scanners to update the scanner detection model, as described herein.

In block 330, the detection system 130 analyzes the images gathered in blocks 310 and 320. In an example embodiment, the detection system 130 feeds the images gathered in blocks 310 and 320 into a neural network, which has been trained with known images of laser scanners. In this embodiment, each image is classified into positive and negative matches for the presence of a laser scanner. The neural network will learn how to classify images into positives and negatives by using a number of images as training data. The features that make a positive or a negative example cannot be determined in advance. The neural network will build it's own model based on the training data that is provided. As more training data is fed into the model, it will continuously improve. In another example embodiment, each image is analyzed to detect image patters.

In block 340, the detection system 130 learns features of laser scanners and is able to classify them into positive and negative matches of laser scanners. In an example embodiment, the detection system 130 creates the scanner detection model. In an example embodiment, the detection system 130 produces an algorithm to adjust the weights of the scanner detection model in order to accurately identify a laser scanner.

The method 210 then proceeds to block 220 in FIG. 2.

Returning to FIG. 2, in block 220, a user 101 selects an electronic record to be saved on the user device 120 or in the user's 101 detection system 130 account. In an example embodiment, the electronic record is an offer, voucher, boarding pass, ticket, form of identification, or other form of electronic record that comprises a machine-readable identifier or barcode to identify the offer and/or redemption terms associated therewith. The methods described herein with reference to an "offer" may be used in connection with any other form of electronic record in other example embodiments.

In an example embodiment, offers are created by the merchant system 110, the manufacturer system (not shown), detection system (130), or another third party system (not shown) and be distributed by the detection system 130. In another example embodiment, the offers are created by the detection system 130 or third party system (not shown) on behalf of the merchant system 110, the manufacturer system (not shown), and/or both systems. In another example embodiment, the offers are distributed by the merchant system 110 or a third party system (not shown).

In an example embodiment, the offers may include, but are not limited to, coupons, loyalty points, prepaid offers, rebates, and other forms of value added services. In this embodiment, the offers may comprise merchant offers, manufacturer offers, third party offers, and other types of offers. In an example embodiment, the offers are for a specific product or group of products. For example, the offer may be for $1.00 off Brand A laundry detergent or $1.00 off a Manufacturer X product. These offers may be redeemed at any merchant that accepts manufacturer coupons. In an alternative example embodiment, the offers are for a particular merchant. For example, the offer may be for $10 off a $50 purchase at Merchant Q. In an alternative example embodiment, the offers comprise loyalty reward point redemptions. For example, the offer may be for 10 loyalty points for every purchase of a Manufacturer X product.

In an example embodiment, the offers comprise details on how the offer can be redeemed and redemption rules. For example, the offer may comprise the identification of the item to be purchased, such as product title, brand information, universal product code ("UPC"), a stock keeping unit ("SKU"), a Japanese article number ("JAN"), a world product code ("WPC"), International Standard Book Number ("ISBN"), European Article Number ("EAN"), color, size, and other relevant sale information.

In an example embodiment, each offer will have one or more rules or conditions associated with it. These rule include, but are not limited to a purchase threshold (for example, receive $1.00 off Brand Z laundry detergent that is regularly priced $5.00 or more, or $10 single purchase of more than $50 from Merchant X), an aggregate purchase threshold (for example, receive $10 off next purchase from a merchant after the accumulated purchase of Manufacturer B products has reached $100), a minimum number of purchases of an item (for example, receive $10 off your tenth purchase of Brand Z items), a time restriction (for example, receive $10 off a lunch-time purchase), a maximum discount (for example, the merchant system 110 sets $10 off as a maximum and user A gets $1 off, while user B gets $2 off), and/or a location restriction (for example, receive $10 off a purchase at a specified location). In an example embodiment, these rules are set by the merchant system 110 at the time the offer is created and reviewed before the offer is applied. In an alternative example embodiment, the offer is a prepaid offer and the redemption rules may include an expiration date. The offer content and discount may be personalized to a particular user. For example, user A may receive a 5% off coupon for a particular product or service while user B may receive a 10% off coupon for the same product or service.

The user 101 reviews the offers. In an example embodiment, the user device 120 displays the offer in a web browser for the user 101 to review. In an example embodiment, the offer is displayed in an offer application 125 resident on the user device 120. In another example embodiment, the offer is displayed in response to an Internet search, in an electronic message or text message, or as a banner or other advertisement in an Internet browser.

The user 101 selects, prepays, agrees to pay for, prints, saves, and/or interacts with the offer. In an example embodiment, the user 101 selects one or more offers distributed by the detection system 130 or by others through the various distribution channels. In an example embodiment, the user 101 selects the offer by clicking on it, pressing a button to "save" the offer, pressing a button to "pay for" the offer, or by other suitable means to indicate a desire to select, pay, and/or save the offer.

The user 101 can download, select, scan, or otherwise capture the offer and import the offer specifics (such as merchant, product, value, redemption rules, and other specifics) to the user device 120. In an exemplary embodiment, the user 101 may register with a merchant system's 110 loyalty rewards program, and offers generated from the loyalty rewards program can be associated with the user device 120. In an example embodiment, the offers are saved on the user device 120 and/or in the user's detection system 130 account.

In block 230, the user 101 elects to enable the laser scanner detection feature on the user device 120. For example, the user 101 can input commands into the user device 120 to open an application that operates the laser scanner detection feature or to select an option in an application to enable the laser scanner detection feature. In an example embodiment, the user 101 may enable the feature at any time prior to or while accessing the offer to be displayed for scanning In an example embodiment, the laser scanner detection feature is an integrated part of an application 125, and the user 101 enables the feature by downloading the application 125 or turning the feature on. In another example embodiment, the laser scanner detection feature is an integrated part of the user device 120 operating system, and the user 101 enables the feature by turning the feature on or downloading an operating system update.

In block 240, the user 101 accesses the offer by accessing an electronic record that includes the offer details. In an example embodiment, the user 101 initiates a purchase transaction with the merchant system 110 to redeem the offer. In an example embodiment, the user 101 accesses the offer via the application 125 by inputting commands into the user device 120 to access the offer saved on the user device 120. In another example embodiment, the offer is saved in the user's 101 detection system 130 account, and the offer is transmitted to the user device 120 for display when the user 101 inputs an instruction into the user device 120 to access the offer. In this embodiment, the user 101 requests access to the offer, and the detection system 130 responds by displaying the offer. In another example embodiment, the detection system 130 responds by transmitting a notification to the scanner detection module 123 to determine the type of scanner prior to displaying the offer.

In block 250, the offer is displayed on the user device 120. In an example embodiment, the offer comprises a machine-readable identifier that identifies the offer and/or redemption terms associated with the offer. The POS terminal 113 uses the machine-readable identifier to access information regarding the offer for application of the offer to a transaction. In an example embodiment, the machine-readable identifier is a barcode or other form of one-dimensional code. In another example embodiment, the machine-readable identifier is a QR code or other form of two-dimensional code. In yet another example embodiment, the machine-readable identifier is any code readable by a machine. The methods described herein with reference to a "barcode" may be used in connection with any other form of machine-readable identifier in other example embodiments.

In an example embodiment, the barcode is displayed on the user interface 121 to be scanned by the scanner 117. In another example embodiment, the offer is displayed, and the user 101 selects a feature that enables the barcode to be displayed. In this embodiment, the methods described herein may be performed after the user 101 selects a feature to enable the barcode to be displayed on the user interface 121. In certain embodiments, the barcode is displayed when the user selects the offer. For example, the user device 120 displays the barcode either independently of or together with information for the offer when the user 101 accesses the offer.

In block 260, the user device 120 determines whether the scanner 117 that is trying to read the barcode displayed on the user device 120 is a laser scanner. In an example embodiment, the user 101 is ready to scan the offer barcode displayed on the user interface 121 of the user device 120 to redeem the offer, and the scanner detection module 123 resident on the user device 120 determines whether the scanner is a laser scanner. The method for determining whether a scanner is a laser scanner is described in more detail hereinafter with reference to the methods described in FIG. 4.

Figure 4:
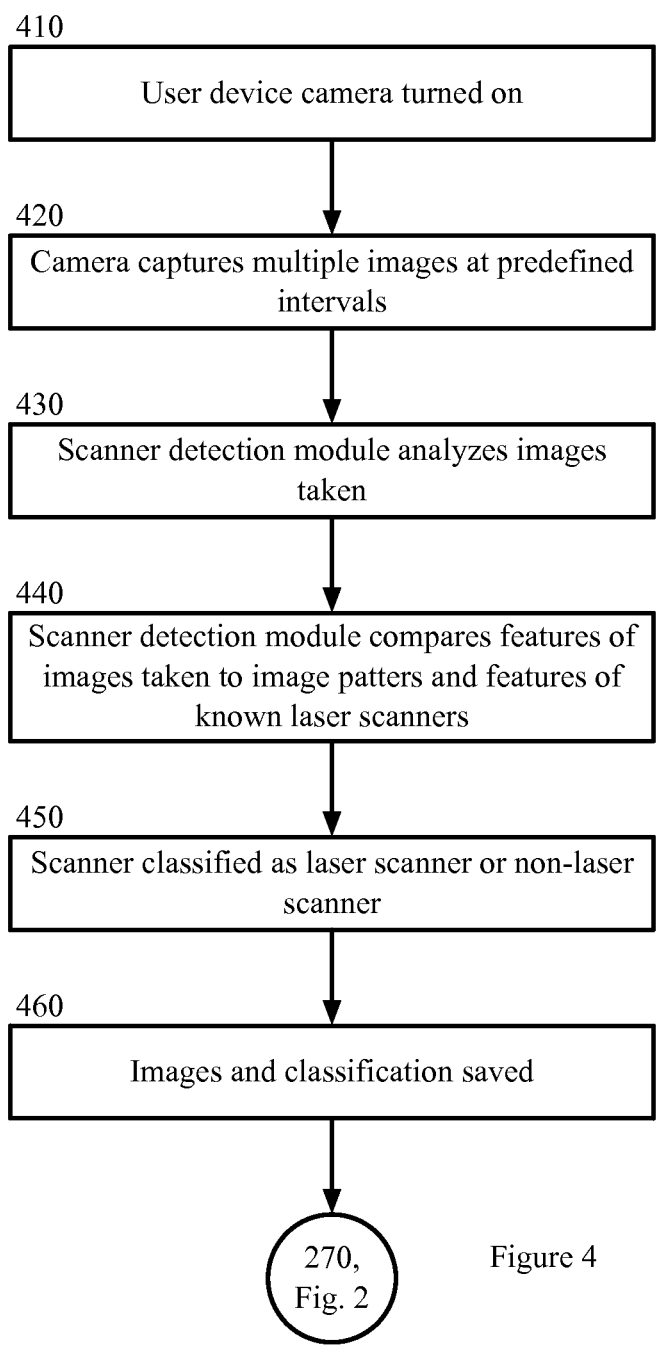
FIG. 4 is a block flow diagram depicting a method for determining whether a scanner is a laser scanner, in accordance with certain example embodiments.

FIG. 4 is a block flow diagram depicting a method 260 for determining whether a scanner 117 is a laser scanner, in accordance with certain example embodiments, as referenced in block 260. The method 260 is described with reference to the components illustrated in FIG. 1.

In block 410, the scanner detection module 123 turns on the camera 129 resident on the user device 120. In an example embodiment, the scanner detection module 123 has been enabled, as previously described with reference to block 230 in FIG. 2, and the module is activated when the user 101 accesses the offer, as previously described with reference to block 240 in FIG. 2. In this embodiment, the scanner detection module 123 turns on the camera 129 to enable the detection of a laser scanner. In another example embodiment, the camera 129 is turned on before the barcode is displayed.

In an example embodiment, the scanner detection module 123 detects whether to turn on the front-facing or back-facing camera 129 or both. In one embodiment, the scanner detection module 123 comprises a default setting to turn on the front-facing camera 129 (in other words, facing the user interface 121). In another example embodiment, the scanner detection module 123 may perform the methods described in block 410 through 450 using the front-facing or back-facing camera 129 or both until a scanner 117 is detected or until the user closes the offer record displayed on the user interface 121.

In block 420, the camera 129 captures multiple images at predefined intervals. In an example embodiment, the predefined intervals are predefined by the detection system 130. In an example embodiment, the predefined intervals are every tenth of a second, every second, or any other predefined interval. In an example embodiment, the camera 129 continues to capture images until the scanner 117 is identified as a laser scanner or non-laser scanner.

In block 430, the scanner detection module 123 analyzes the images captured in block 420 of FIG. 4. In an example embodiment, the captured images are analyzed while additional images are being taken. In an example embodiment, the scanner detection module 123 comprises code from the detection system 130 that allows it to identify features of a laser scanner trying to scan information, and to detect image patterns that will aid in the identification of the scanner 117. In an example embodiment, the code from the detection system 130 comprises the scanner detection model. In an example embodiment, the scanner detection module 123 identifies image features and patterns of the captured images, and applies an algorithm to determine whether the scanner 117 is a laser scanner. In an example embodiment, the image classifier module 135 has learned features in images that are associated with laser scanners, as described previously with reference to FIG. 3. In an example embodiment of block 430, the scanner detection module 123 analyzes images captured by the camera 129 to extract features from those images, to compare the extracted features with the features associated with laser scanners, and to determine whether the extracted features match or correlate sufficiently with any of the features associated with laser scanners. If the scanner detection module 123 determines that the extracted features match or correlate sufficiently with any of the features associated with laser scanners, then the scanner detection module 123 identifies the scanner that is trying to scan the displayed machine-readable identifier as a laser scanner. Alternatively, If the scanner detection module 123 determines that the extracted features do not match or correlate sufficiently with any of the features associated with laser scanners, then the scanner detection module 123 does not identify the scanner that is trying to scan the displayed machine-readable identifier as a laser scanner.

In another example embodiment, the scanner detection module 123 analyzes the wavelength or color emitted by the scanner 117. For example, the scanner detection module 123 detects the red light emitted by the scanner 117, and classifies the scanner 117 as a laser scanner based on the detection of the color of light emitted. In another example embodiment, the scanner detection module 123 analyzes the captured images, and identifies specific features to classify the scanner 117. In this embodiment, the specific features have been previously identified by the detection system 130 as indicating the scanner 117 is a laser scanner. For example, the scanner detection module 123 will identify whether the captured images contain over a specified percentage of a predefined color, such as red.

In block 450, the scanner detection module 123 classifies the scanner 117 as a laser scanner or a non-laser scanner, based on the results of block 440. In an example embodiment, the scanner detection module 123 classifies the scanner 117 based on the analysis of the captured images and the scanner detection model.

In block 460 the captured images and the classification of the scanner 117 are saved. In an example embodiment, the captured images and the classification of the scanner 117 are saved in the data storage unit 127, and transmitted to the detection system 130 as described herein with reference to FIG. 5.

The method 260 then proceeds to block 270 in FIG. 2.

Returning to FIG. 2, in block 270, the scanner detection module 123 determines whether the scanner 117 is a laser scanner. In an example embodiment, the determination is made based on the classification described in block 450 in FIG. 4.

If the scanner 117 is not a laser scanner, the method 200 proceeds to block 275 in FIG. 2. In block 275, the barcode is displayed and scanned by the scanner 117.

The method 200 then proceeds to block 290 in FIG. 2.

Returning to block 270, if the scanner 117 is a laser scanner, the method 200 proceeds to block 280 in FIG. 2.

In block 280, the user device 120 displays a message directing the merchant to enter the barcode information into the POS terminal 113. In an example embodiment, the machine-readable identifier is removed from the user interface 121, and a message is displayed indicating that the scanner is unable to adequately read the information. In another example embodiment, the message can be displayed over or otherwise on the same screen as the machine-readable identifier. The user 101 is prompted by the message to tell the merchant to manually enter the code. In an example embodiment, the code is a series of numbers, letters, symbols, or a combination thereof that is read from the user interface 121 of the user device 120 and entered into the POS terminal 113. In an example embodiment, the application 125 interprets the machine-readable identifier, and displays an alpha-numeric identification for the offer to facilitate manual entry of the offer information into the POS terminal 113.

In block 285, the merchant enters the code into the POS terminal 113. In an example embodiment, the code is entered via a keypad (not shown) or other input mechanism coupled to or otherwise integrated with the POS terminal 113.

In block 290, the offer is redeemed. For example, the POS terminal 113 uses the offer identification obtained from the machine-readable identifier or the manual input, accesses redemption information associated with the offer based on the identification, and applies the offer to current transaction if the transaction meets the redemption terms of the offer. In an example embodiment, the user 101 pays any additional balance, and the purchase transaction is completed. In an example embodiment, the user 101 exits the application 125, and the scanner detection module 123 is inactivated.

In block 295, the scanner detection model is updated. In an example embodiment, the scanner detection model is continuously updated. In this embodiment, the scanner detection module 123 is continuously updated to reflect the updated model. The method for updating the laser scanner detection model is described in more detail hereinafter with reference to the methods described in FIG. 5.

Figure 5:
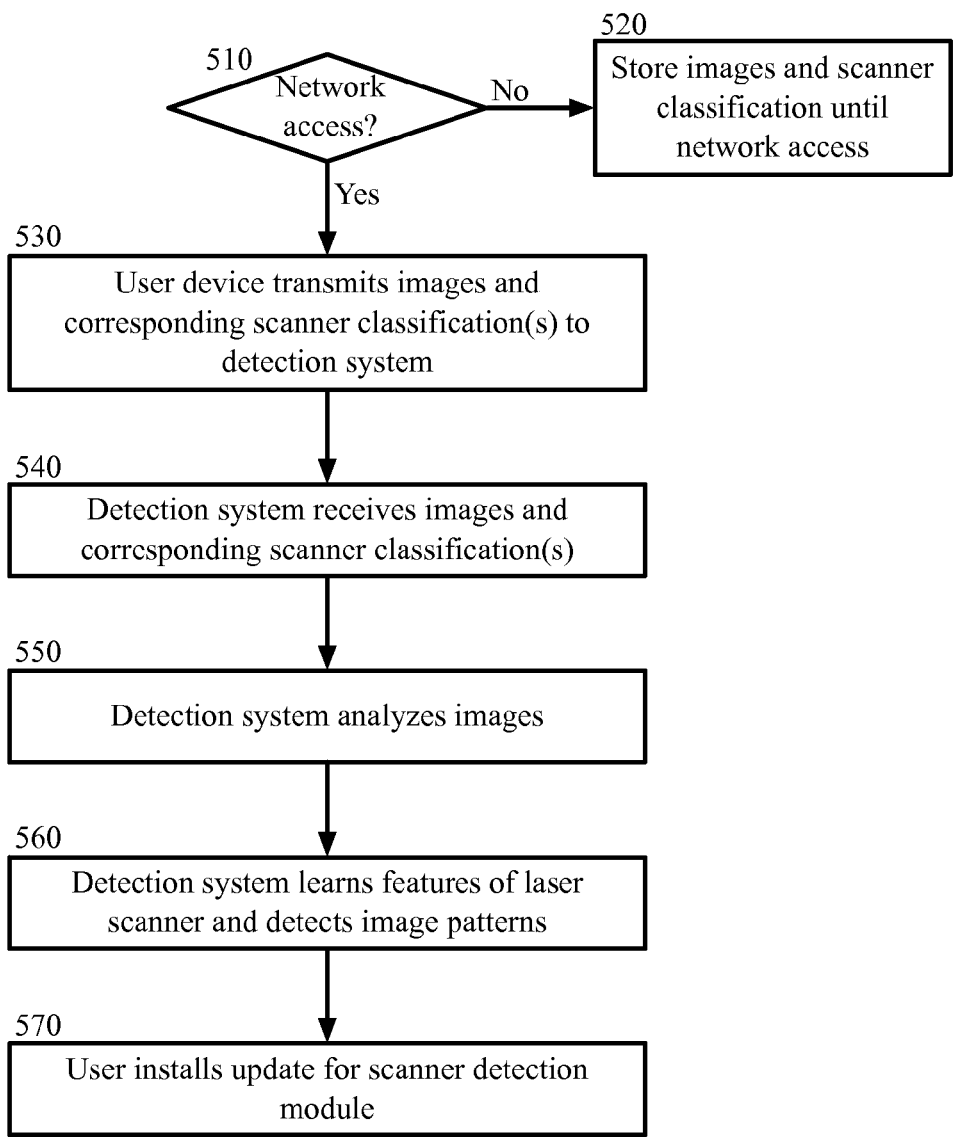
FIG. 5 is a block flow diagram depicting a method for updating the laser scanner detection model, in accordance with certain example embodiments.

FIG. 5 is a block flow diagram depicting a method 295 for updating the laser scanner detection model, in accordance with certain example embodiments, as referenced in block 295. The method 295 is described with reference to the components illustrated in FIG. 1.

In block 510, the user device 120 determines whether it has network 140 access. In an example embodiment, the captured images and scanner 117 classification are transmitted to the detection system 130 via the network concurrently with the completion of the purchase transaction. In another example embodiment, the captured images and scanner 117 classification are transmitted to the detection system 130 via the network 140 at a later time.

If the user device 120 does not have network 140 access, the method 295 proceeds to block 520.

In block 520, the captured images and scanner 117 classification are stored until the user device 120 has network access. In an example embodiment, the captured images and scanner 117 classification are stored in the data storage unit 127.

Returning to block 510, if the user device 120 has network 140 access, the method 295 proceeds to block 530.

In block 530, the user device 120 transmits the captured images and corresponding scanner 117 classification(s) to the detection system 130. In an example embodiment, the user device 120 was without network 140 access, and transmits all saved images and corresponding scanner 117 classifications. In another example embodiment, the user device 120 only transmits the saved images and corresponding scanner 117 classifications that have not been previously transmitted to the detection system 130.

In block 540, the detection system 130 receives the images and the corresponding scanner classification(s).

In block 550, the detection system 130 analyzes the images. In an example embodiment, the images are analyzed in a manner consistent with the previously described with reference to block 330 in FIG. 3.

In block 560, the detection system 130 learns features of a laser scanner and detects image patterns. In an example embodiment, the detection system 130 updates the scanner detection model based on the images and classification(s) received from the user device 120. In this embodiment, the detection system 130 modifies the algorithm that adjusts the weights of the scanner detection model in order to accurately identify a laser scanner.

In block 570, the user 101 installs an update for the scanner detection module 123. In an example embodiment, the scanner detection module 123 is updated as part of a user device 120 operating system update. In another example embodiment, the scanner detection module 123 is updated as part of an application 125 update. In an example embodiment, the user 101 is prompted to install an update on a periodic basis as the scanner detection model is updated.

Other Example Embodiments

Figure 6:
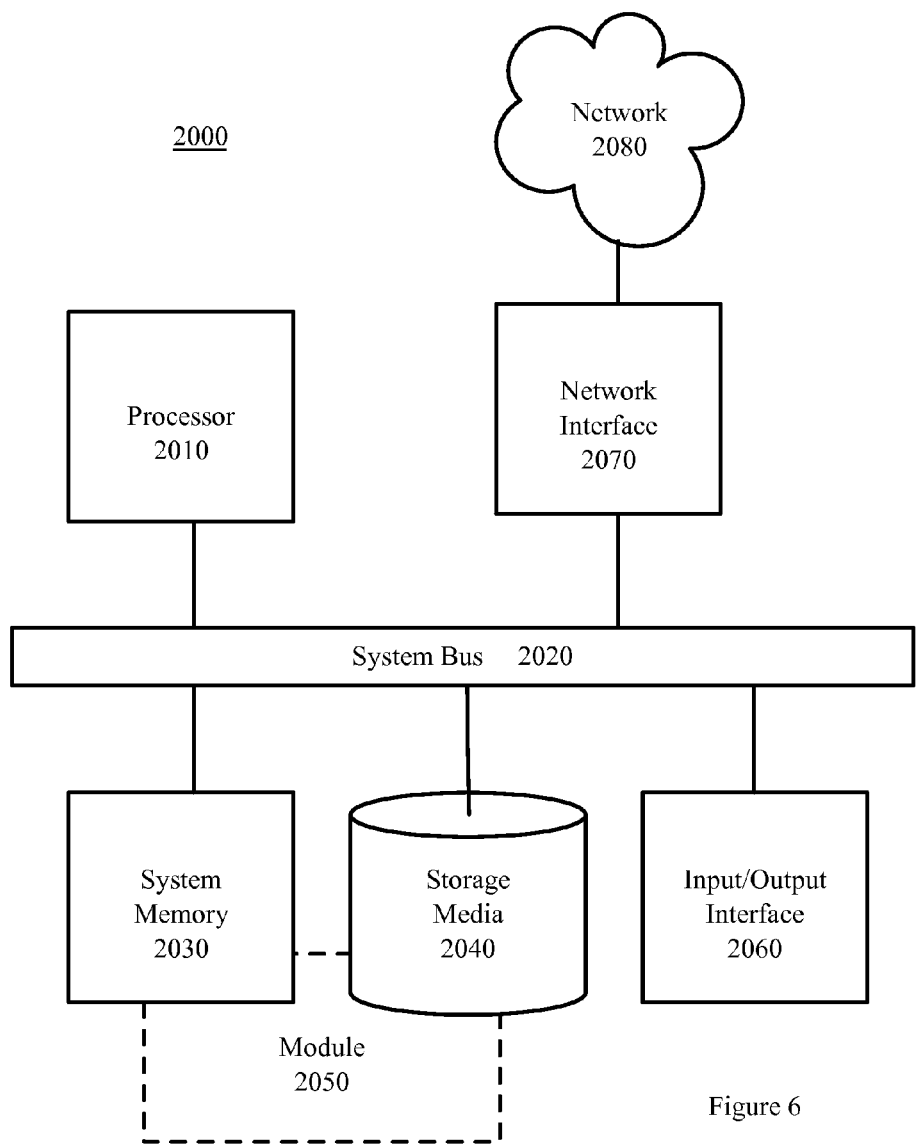
FIG. 6 is a block diagram depicting a computer machine and module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for detecting laser scanners, comprising:
    receiving, by a computing device, a request to access an electronic record, the electronic record comprising a machine-readable identifier to be read by a scanner;
    displaying, by the computing device, the machine-readable identifier of the electronic record via a user interface of the computing device, in response to receiving the request to access the electronic record;
    activating, by the computing device, a camera function of the computing device;
    capturing, by the computing device, one or more images via the camera function of the computing device while the machine-readable identifier displayed on the user interface of the computing device is being scanned by the scanner;
    analyzing, by the computing device, the one or more captured images using patterns in images of laser scanners identified by an artificial neural network or adaptive system model for identifying laser scanners created by a detection computing system to determine that the scanner is a laser scanner, wherein the detection computing system analyzed the images of laser scanners and identified patterns in the images that correlate to laser scanners to create the artificial neural network or the adaptive system model for identifying laser scanners; and
    displaying, by the computing device, a message via the user interface of the computing device when the scanner is determined to be a laser scanner, wherein the message indicates that the displayed machine-readable identifier cannot be read by the scanner.

2. The method of claim 1, wherein the machine-readable identifier is a barcode.

3. The method of claim 1, wherein the machine-readable identifier is a type of identifier that a laser scanner cannot read when displayed on the user interface of the computing device.

4. The method of claim 1, wherein the electronic record comprises an offer, boarding pass, ticket, voucher, or identification record.

5. The method of claim 1, further comprising receiving, by the detection computing system, the one or more captured images from the computing device.

6. The method of claim 5, further comprising, updating, by the detection computing system, the artificial neural network or adaptive system model for identifying laser scanners based on the one or more captured images received from the computing device.

7. The method of claim 1, wherein the computing device determines that the scanner is a laser scanner in real time or near real time with the machine-readable identifier being displayed.

8. The computer program product of claim 7, further comprising computer-readable program instructions to transmit the one or more captured images to the detection computing system.

9. The computer program product of claim 7, wherein the detection computing system updates the artificial neural network or adaptive system model for identifying laser scanners based on the one or more captured images.

10. The computer program product of claim 7, wherein the computer determines that the scanner is a laser scanner in real time or near real time with the electronic record being displayed.

11. The method of claim 1, wherein the computing device comprises the detection computing system.

12. A computer program product, comprising:
    a non-transitory computer-readable medium having computer-readable program instructions embodied therein that when executed by a computer cause the computer to detect laser scanners, the computer-readable program instructions comprising:
        computer-readable program instructions to receive a request to access an electronic record on a computing device, the electronic record comprising a machine-readable identifier to be read by a scanner while displayed on a user computing device;
        computer-readable program instructions to activate a camera function of the computing device, in response to receiving the request to access the electronic record;
        computer-readable program instructions to capture one or more images via the camera function of the computing device;
        computer-readable program instructions to analyze the one or more captured images using patterns in images of laser scanners identified by an artificial neural network or adaptive system model for identifying laser scanners created by a detection computing system to determine that the scanner is a laser scanner, wherein the detection computing system analyzed the images of laser scanners and identified patterns in the images that correlate to laser scanners to create the artificial neural network or the adaptive system model for identifying laser scanners; and
        computer-readable program instructions to display a message via a user interface of the user computing device when the scanner is determined to be a laser scanner, wherein the message indicates that the displayed machine-readable identifier cannot be read by the scanner.

13. The computer program product of claim 12, wherein the machine-readable identifier is a barcode.

14. The computer program product of claim 12, wherein the machine-readable identifier is a type of identifier that a laser scanner cannot read when displayed on the user interface of the user computing device.

15. The computer program product of claim 12, wherein the electronic record comprises an offer, boarding pass, ticket, voucher, or identification record.

16. A system for detecting laser scanners, comprising:
    a storage device;
    a display screen; and
    a processor communicatively coupled to the storage device, wherein the processor executes application code instructions that are stored in the storage device and that cause the system to:
        display a machine-readable identifier via a user interface on the display screen;
        activate a camera function of the computing device;
        capture one or more images via the camera function while the machine-readable identifier displayed on the user interface is being scanned by a scanner; and
        analyze the one or more captured images using patterns in images of laser scanners identified by an artificial neural network or adaptive system model for identifying laser scanners created by a detection computing stem to determine that the scanner is a laser scanner, wherein the detection computing system analyzed the images of laser scanners and identified patterns in the images that correlate to laser scanners to create the artificial neural network or the adaptive system model for identifying laser scanners.

17. The system of claim 16, wherein the processor is further configured to execute computer-executable instructions stored in the storage device to cause the system to display a message via the user interface on the display screen when the scanner is determined to be a type of scanner that is unable to read the machine-readable identifier displayed on the display screen, wherein the message indicates that the displayed machine-readable identifier cannot be read by the scanner.

18. The system of claim 16, wherein the machine-readable identifier is a type of identifier that a laser scanner cannot read when displayed via the user interface.

19. The system of claim 16, wherein the machine-readable identifier is associated with an electronic record that comprises an offer, boarding pass, ticket, voucher, or identification record.

20. The system of claim 16, wherein the processor is further configured to execute computer-executable instructions stored in the storage device to cause the system to transmit the one or more captured images to the detection computing system.

21. The system of claim 16, wherein the detection computing system updates the artificial neural network or adaptive system model for identifying laser scanners based on the one or more captured images.

22. The system of claim 16, wherein the system determines that the scanner is a laser scanner in real time or near real time with the machine-readable identifier being displayed.

* * * * *